United States Patent [19]
Dragsund et al.

[11] Patent Number: 6,070,857
[45] Date of Patent: Jun. 6, 2000

[54] DEVICE FOR THE STORAGE AND DEPLOYMENT OF OCEAN BOTTOM SEISMIC CABLE

[75] Inventors: Inge Dragsund, Ulsteinvik; Bård Kvalsund, Fosnavåg, both of Norway

[73] Assignee: Odim Holding A/S, Ulsteinvik, Norway

[21] Appl. No.: 08/968,509

[22] Filed: Nov. 12, 1997

[30] Foreign Application Priority Data

Nov. 12, 1996 [NO] Norway ..................................... 964790
Sep. 2, 1997 [NO] Norway ..................................... 974019

[51] Int. Cl.[7] ............................. B65H 75/00; B65H 54/00
[52] U.S. Cl. ..................................................... 254/134.3 SC
[58] Field of Search ................................... 254/134.3 SC, 254/134.5, 134.6, 134 R, 382; 242/400.1, 403, 388.9, 388.91; 114/343, 364, 242, 244, 253, 254

[56] References Cited

U.S. PATENT DOCUMENTS

| | | | |
|---|---|---|---|
| 3,086,754 | 4/1963 | Niederer | 254/134.3 SC |
| 3,093,333 | 6/1963 | Bishop | 254/134.3 SC |
| 3,911,690 | 10/1975 | Gracia | 254/134.3 SC |
| 4,068,489 | 1/1978 | Priaroggia | 254/134.3 SC |
| 4,372,161 | 2/1983 | De Buda et al. | 254/134.3 SC |
| 4,865,358 | 9/1989 | Jokinen . | |
| 4,917,540 | 4/1990 | Recalde | 254/134.3 SC |
| 5,175,989 | 1/1993 | Messina | 254/134.3 SC |
| 5,199,659 | 4/1993 | Zibilich, Jr. | 254/134.3 SC |
| 5,284,323 | 2/1994 | Pawkett | 254/134.3 SC |
| 5,488,920 | 2/1996 | Gjestrum . | |
| 5,624,207 | 4/1997 | Berges | 254/134.3 SC |
| 5,655,753 | 8/1997 | Berges et al. | 254/134.3 SC |
| 5,807,026 | 9/1998 | Valette | 254/134.3 SC |

*Primary Examiner*—David A. Scherbel
*Assistant Examiner*—Lee Wilson
*Attorney, Agent, or Firm*—Pillsbury Madison & Sutro

[57] ABSTRACT

A device for storing ocean bottom seismic cable (1) on board a vessel, which comprises a rack (11) positioned so that the cable (1) can be hung up thereon, moreover, a device for deploying cable stored on the aforementioned device is described, where as an extension to the rack (11) there may be provided an element (18) for guiding the cable (1) astern from the rack and releasing the cable (1) behind the vessel, and also a regulator (19) for controlling the deployment speed of the cable.

8 Claims, 7 Drawing Sheets

DEVICE FOR THE STORAGE AND DEPLOYMENT OF OCEAN BOTTOM SEISMIC CABLE

BACKGROUND OF THE INVENTION

The present application has been divided out from Ser. No. 964,790 which relates to a device for the retrieval of ocean bottom seismic cable.

Seismic investigations at sea are usually carried out by using surface seismic, where a seismic cable with monitoring equipment is towed behind a vessel, where, for example, air is "shot" into the water and forms sound waves which are reflected by the layers in the underlying rock formation, and where these reflections are registered by means of the monitoring equipment of the seismic cable.

Computer analyses of the registered pattern of reflections provide a basis for mapping structures of interest below the ocean floor.

Ocean bottom seismic bears a strong resemblance to surface seismic, with the exception that the monitoring cables are positioned on the ocean floor, so that the monitoring equipment is in direct contact with the floor. The advantage of this type of seismic is that by direct contact between the underlying floor and the monitoring equipment the sensitivity of the equipment is increased, and the measurements obtained are more accurate and detailed, giving the basis for an even more detailed mapping of the underlying structures. However, ocean bottom seismic is more expensive to carry out than surface seismic.

Typically, an ocean bottom seismic cable is 10 to 12 km in length and is composed of a plurality of sections of about 300 m in length fitted together using a connecting piece, and the monitoring equipment which is to record signals from the ocean floor is placed at defined positions on the cable.

The cable can be laid on the ocean floor by being released from the stern of a vessel travelling at a speed of 2 to 5 knots across the ocean floor, upon which the monitoring cable is to be placed. During the registration of ocean bottom seismic a plurality of cables are laid in parallel relation and spaced apart at a given distance on the ocean floor. Normally, the work will be carried out continuously so that two to four cables are used for monitoring, whilst the monitoring field is moved across the ocean floor by taking up the cable which lies outermost in the monitoring field, and moving this cable parallel with the other cables across to the other side of the monitoring field. During an operation of this kind three vessels are normally involved, one vessel which "shoots" and two vessels which alternate between monitoring the laid cables and moving the monitoring field by taking up a cable along one side edge of the field and moving across to the other side edge thereof.

Today, the ocean bottom seismic cable is retrieved by running the cable over a wheel which is located on the side at the front of the vessel. The cable is led over a wheel and in between a powered rubber wheel which ensures that the cable is passed abaft on the boat in a groove to the stern, where a block, suspended in a travelling crane, lays the cable out across the deck so as to facilitate the location of the specific read-off points and the connecting pieces. The cable thus lies like a "heap of spaghetti" on the deck, where only the said read-off points and the connecting pieces are accessible for measurement. En route to and from the survey, there may be two to three such cables lying on top of one another on a deck of a vessel of this kind.

A major and costly problem in connection which such ocean bottom seismic is that the cable tends to incur some damage, and much time is spent repairing this. This repair work is usually carried out by locating the fault through measurements at the defined read-off points and then replacing one or more sections. With the cable lying in a heap on deck, a replacement of this kind is difficult and extremely time-consuming.

Studies have also shown that about 50% of the damage to the cable takes place on board the boat during retrieval and deployment. The traditional manner of deploying the cable is that the said travelling crane and block are positioned on the stern of the boat, so that the cable is led out through this block when being deployed. The cable, which is lying across the deck, is pulled during normal deployment at a speed of up to 2.5 m per second, which means that the cable which is swung from side to side on the deck will be thrown against other cables and against the boat during deployment. The monitoring equipment found on the cable is delicate equipment and can easily be damaged by such buffeting, and this requires the replacement of sections when the cables are redeployed. Moreover, the stern of the ship during a deployment operation of this kind will be a dangerous area, to which access is only possible with stringent safety measures.

Damage to the cable occurs also because of jerks and uneven pull on the cable during the retrieval thereof. Normally, the cable runs, as mentioned above, over a wheel at the front on the side of the vessel. This wheel is fixed and follows the motions of the vessel, so that in rough seas there will be jerks on the cable. Moreover, the cable must run straight up from the ocean bottom, so that there is no tension in any direction along the ocean bottom, as this could cause the cable to become caught on objects on the bottom.

A preferred device for the retrieval of seismic cable is described in Ser. No. 964,790, where the cable is pulled up from the bottom and hauled aboard a vessel over a roller, a wheel or the like, wherein the device comprises two or more wheels and where the cable is first led over a front wheel located on an arm, which arm is pivotally mounted about an axis, and that the cable is then passed under a second wheel before it is brought aboard the vessel, optionally via one or more additional wheels.

BRIEF SUMMARY OF THE INVENTION

The objective of the present invention is thus to provide a device storing an ocean bottom seismic cable on board a vessel and a device for deploying the cable.

This has been achieved by means of a device for storing ocean bottom seismic cable on board a vessel, which comprises a rack that is positioned so that the cable can be hung up thereon.

Moreover, the present application relates to a device for deploying the cable which is stored on the aforementioned rack, where as an extension of the rack there may be provided means to guide the cable astern from the rack and to release the cable behind the vessel, and also means for controlling the deployment speed and position of the cable.

The device for storing the cable on board ensures that the cable in its entire length is accessible for inspection and that individual sections can be disconnected and new sections connected. This eases the work of inspection and repair of the cable considerably, and makes it possible to replace the damaged sections immediately without any expensive interruption of the ongoing seismic investigations. Moreover, this device also facilitates an easier deployment of the cable, without the cable and its delicate equipment being thrown against other cables or against the ship in a way which may damage the equipment.

BRIEF DESCRIPTION OF THE SEVERAL VIEWS OF THE DRAWING

The present invention will now be described in more detail with reference to the attached drawings, wherein.

DETAILED DESCRIPTION OF THE INVENTION

Figure 4:
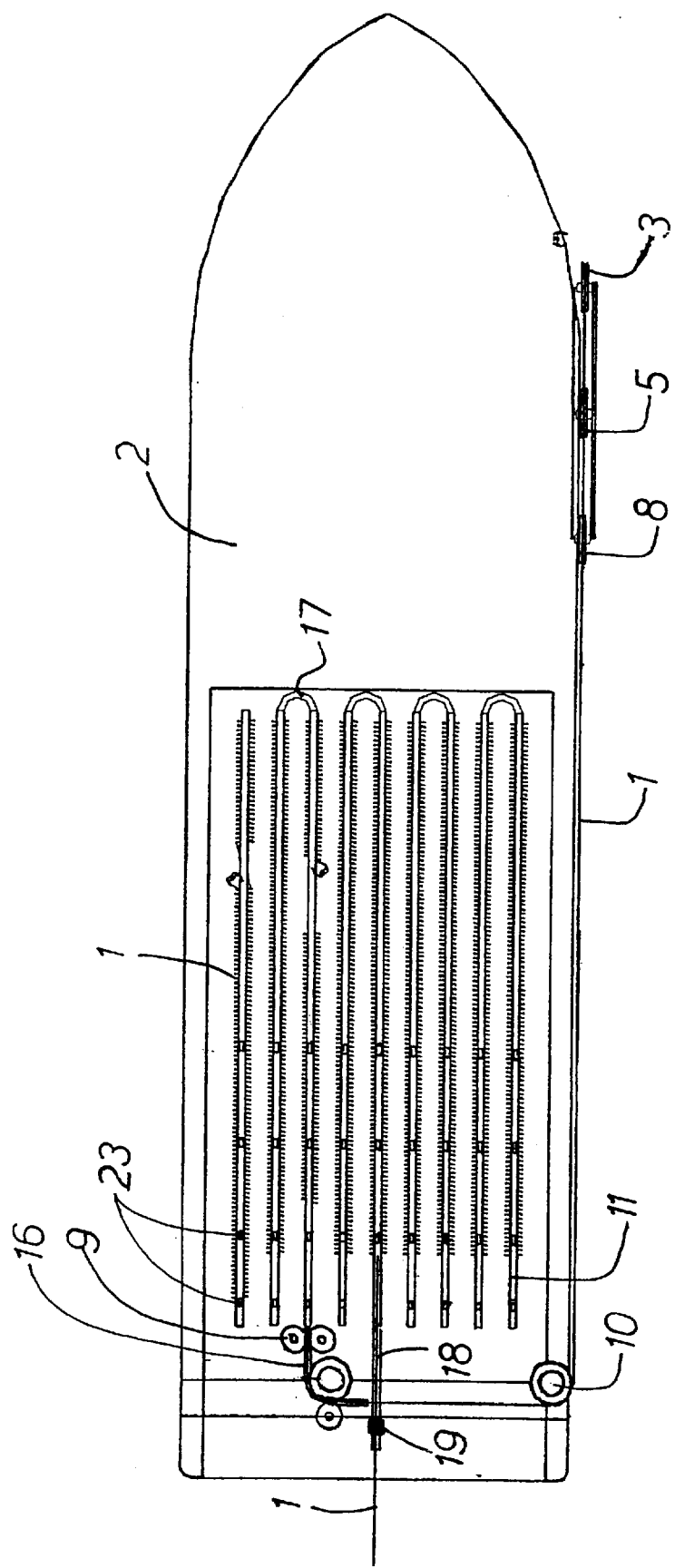
FIG. 4 is a plan view of a vessel equipped with a device for the retrieval of cable and a device for storing the same.

Once the cable 1 has been brought on board the ship 2, near the ship's bow, preferably by the device 3, 5, 8 described in the copending application Ser. No. 964,790, the cable is fed by means of a powered guiding wheel 10 and/or groove 23 towards a cable storage device. FIG. 4 shows an example of a cable storage device according to the invention, where the cable is led from the retrieving device 3, 5, 8 to the stem of the ship, where the cable is pulled forward between two powered rubber wheels 9, and is then hung up on the storage device. All wheels for advancing the cable 1 are powered and have tension control to prevent excessive tension in the cable.

The storage device consists of a rack 11 for suspension of the cable, and means for suspending the cable on the rack.

Figure 1:
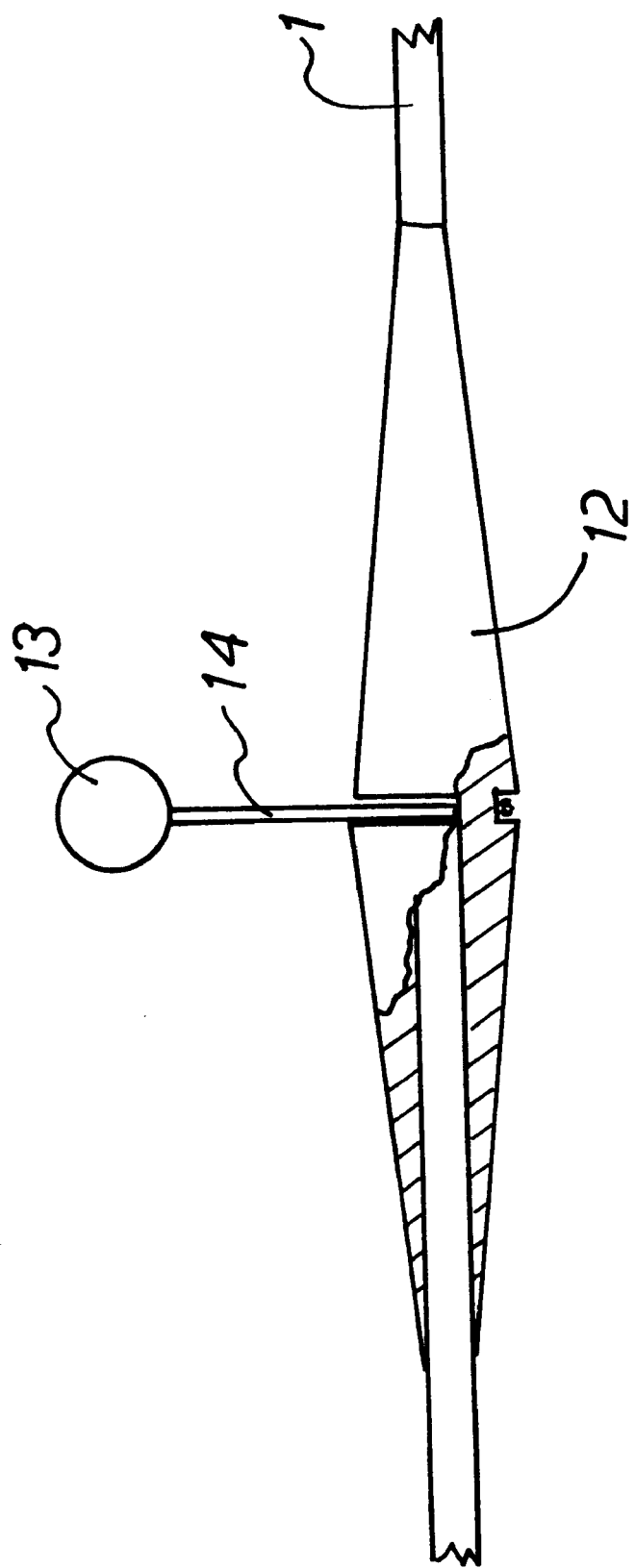
FIG. 1 is a partially cut away side view of an attachment fitting integrally cast on the cable.
Figure 2:
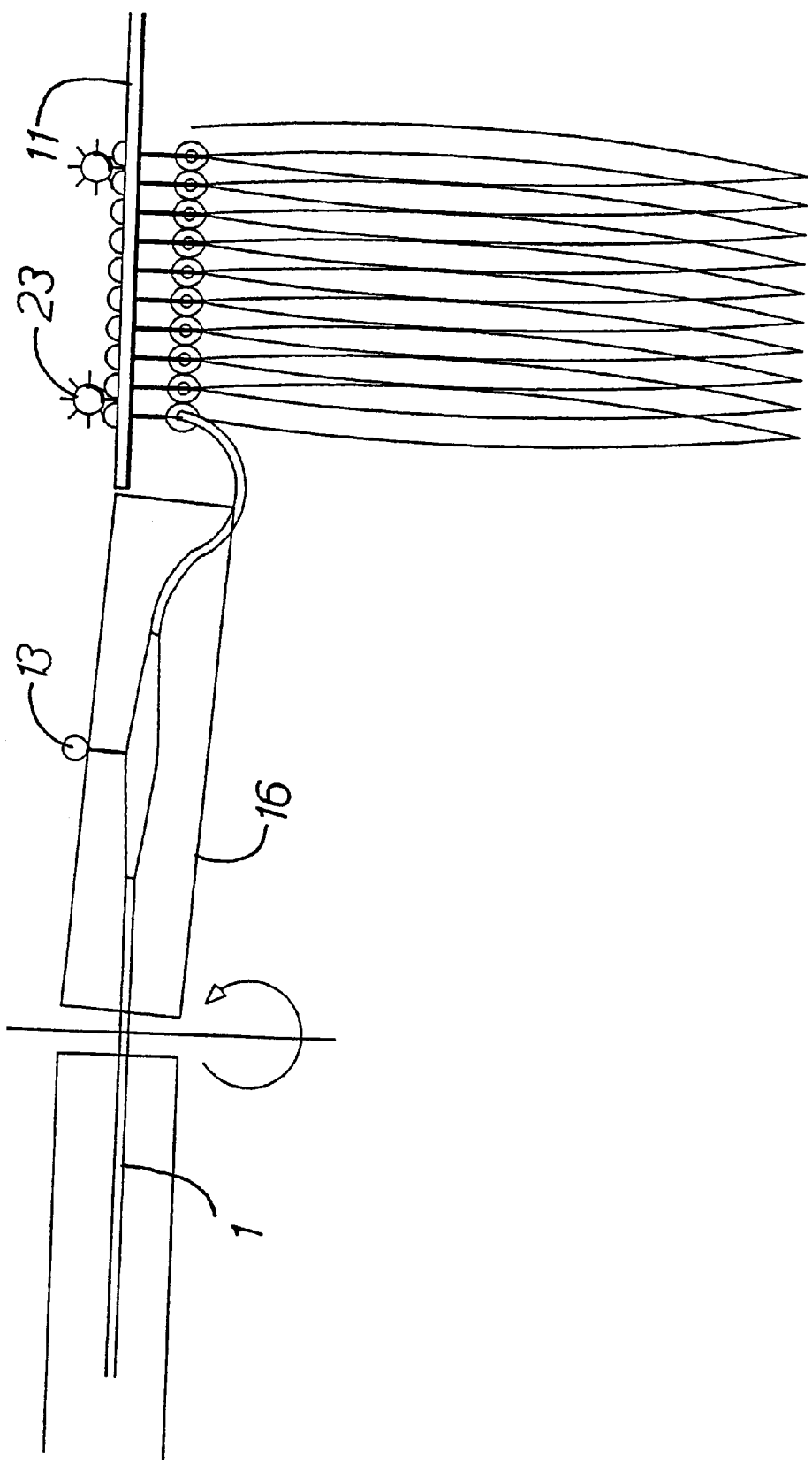
FIG. 2 is a partially cut away side view of a device for suspending the cable on a cable storage device.
Figure 3:
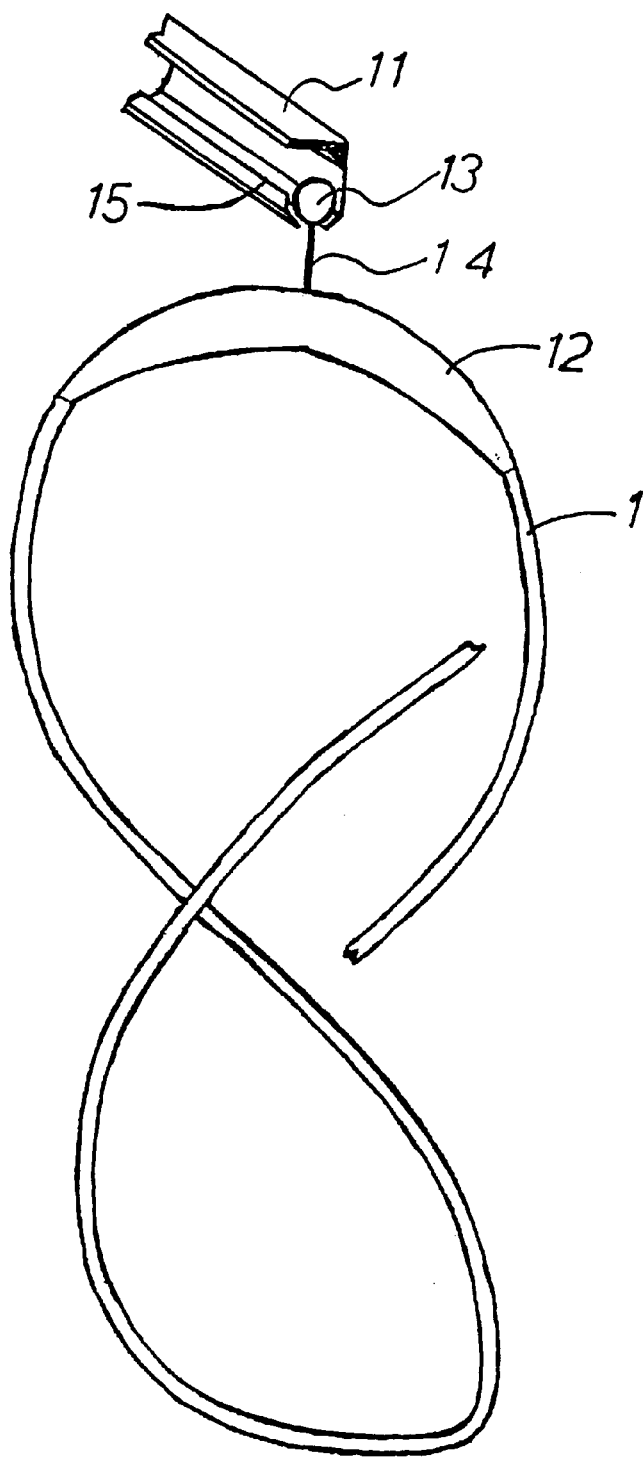
FIG. 3 is a section of the cable storage device, where a cable at a cast point of attachment is suspended in the rack.

In the case of one embodiment, as shown in FIGS. 1, 2 and 3, there is an integrally cast point of attachment 12 on the cable 1. A ball 13 is secured to this point of attachment 12 with the aid of a spacer 14. The spacer 14 may be a fixed rod, a rope or a wire which may be permanently or releasably affixed to the point of attachment 12. The ball 13 is adapted for suspension in track 15 on the rack 11. When the cable moves in towards the rack, it is fed in a groove 16 which leads the cable towards the rack and where devices are provided to ensure that the ball 13 is positioned outside the groove in which the cable is fed, so that it is led in towards the track 15 on the rack 11. As an alternative to having devices to ensure that the ball is positioned correctly, this operation can be carried out using manpower. The ball 13 is thus fed into the track 15 on the rack 11, and the cable 1 is fed in below the rack 11. The cable thus hangs from the balls and the points of attachment 12 which are integrally cast on the cable.

The points of attachment 12 are preferably secured at predetermined and fixed intervals adapted to the height of the rack 11 above the deck and the length of the cable, and the points of attachment, which are preferably of rubber or the like, and have a rigidity which means that the cable around the point of attachment does not bend at a radius that is less than the minimum bending radius of the cable. This is best shown in FIG. 3.

Once the balls 13 are suspended in the rack 11, the previously suspended balls and thus the cable 1 are fed further in on the rack. This may be done, for example, as shown with the aid of feed wheels 23, as shown in FIG. 2, or other means for advancing the balls on the rack 11.

As shown in FIG. 4, a plurality of parallel racks 11 are located on the ship deck. The device for feeding the balls and the cable to the rack 11 can be moved, as required, from rack to rack 11 according to which one it is desired to hang the cable on. When one rack 11 is full, the cable can run from one rack to another with the aid of deviation members 17. These deviation members 17 can be positioned at the fore end or the after end between the racks 11, so that one continuous cable can be hung in several of the parallel racks 11.

Figure 5:
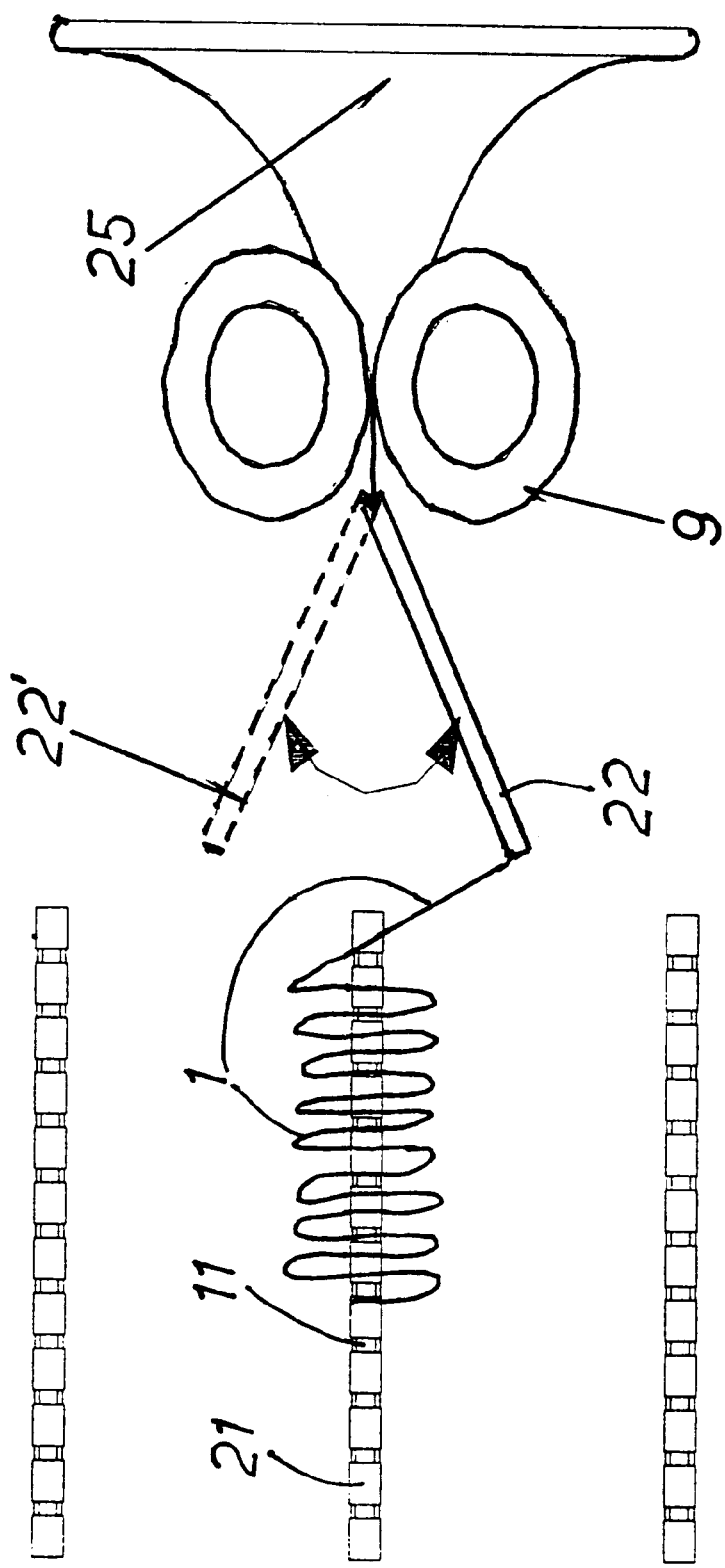
FIG. 5 is a schematic plan view of an alternative device for suspension and storage of the cable.

One of the major advantages of the present device, in addition to hanging the cable tidily and in a readily surveyable manner, is that all the measuring points and connection points, as well as all other parts of the cable, are accessible for inspection and measurement. If one or more cable sections in the middle of a longish cable need to be replaced, it is possible, as indicated in FIG. 5, to disconnect this cable section and replace it with a new one. This can be done in that the track 15 on the rack 11 can be opened at given intervals, so that balls can be taken out or put in, or that the spacer 14 is releasably secured to the point of attachment 12, so that the spacer 14 can be released from the point of attachment 12 on the cable 1 which is to be taken off, the cable is removed and then a new cable is put in place, and the spacers 14 are once more secured to the points of attachment 12 on the new cable section. This replacement can be done swiftly and without any unnecessary interruption in the operation of the ship, and thus interruptions of the seismological survey.

Figure 7A:
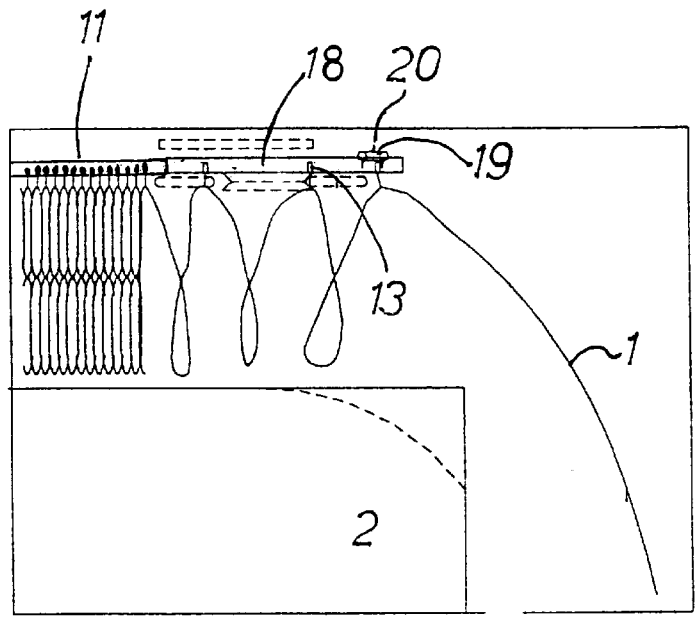
FIGS. 7a,b are side views of two alternative deployment devices.
Figure 7B:
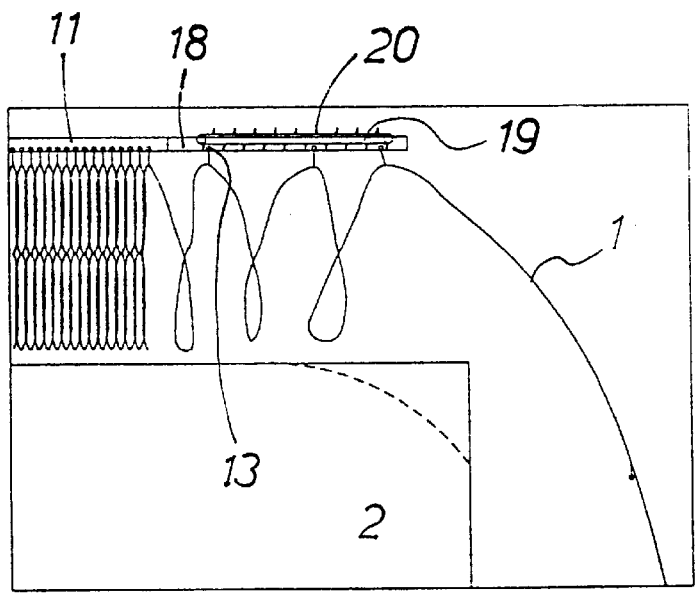

This embodiment also allows a simple deployment of the cable which causes minimum strain and danger of buffeting and subsequent damage of the equipment mounted on the cable. When deploying a cable, an outlet groove 18 is provided as an extension of the rack 11 from which the cable is to run out. When the ship is in the correct position, the deployment of the cable starts in that the cable is led astern to the outlet groove and is fed out behind the stem of the ship and released into the water. To ensure a deployment speed which is adapted to the speed of the ship during deployment, means are provided, preferably in connection with the outlet groove, which release one ball at a time, so that the cable is released at exactly the same speed as that at which the boat moves across the ocean floor. FIG. 8a is a side view of an embodiment of a device for deploying the cable, where deployment regulator 19 consists of a short conveyor having pins 20, where one ball 13 is positioned in each space between the pins, so that the balls are released one at a time in response to the control signals given by the boat's navigation system for the release speed of the balls. The illustrated deployment regulator 19 has three pins 20, but the conveyor may be longer, so that the device may have a plurality of such pins, if so desired. An example of such a device is shown in FIG. 7b.

The cable deployment device may preferably be moved thwartships between the racks so that it is moved to the relevant rail 11 prior to the start of deployment.

Figure 6:
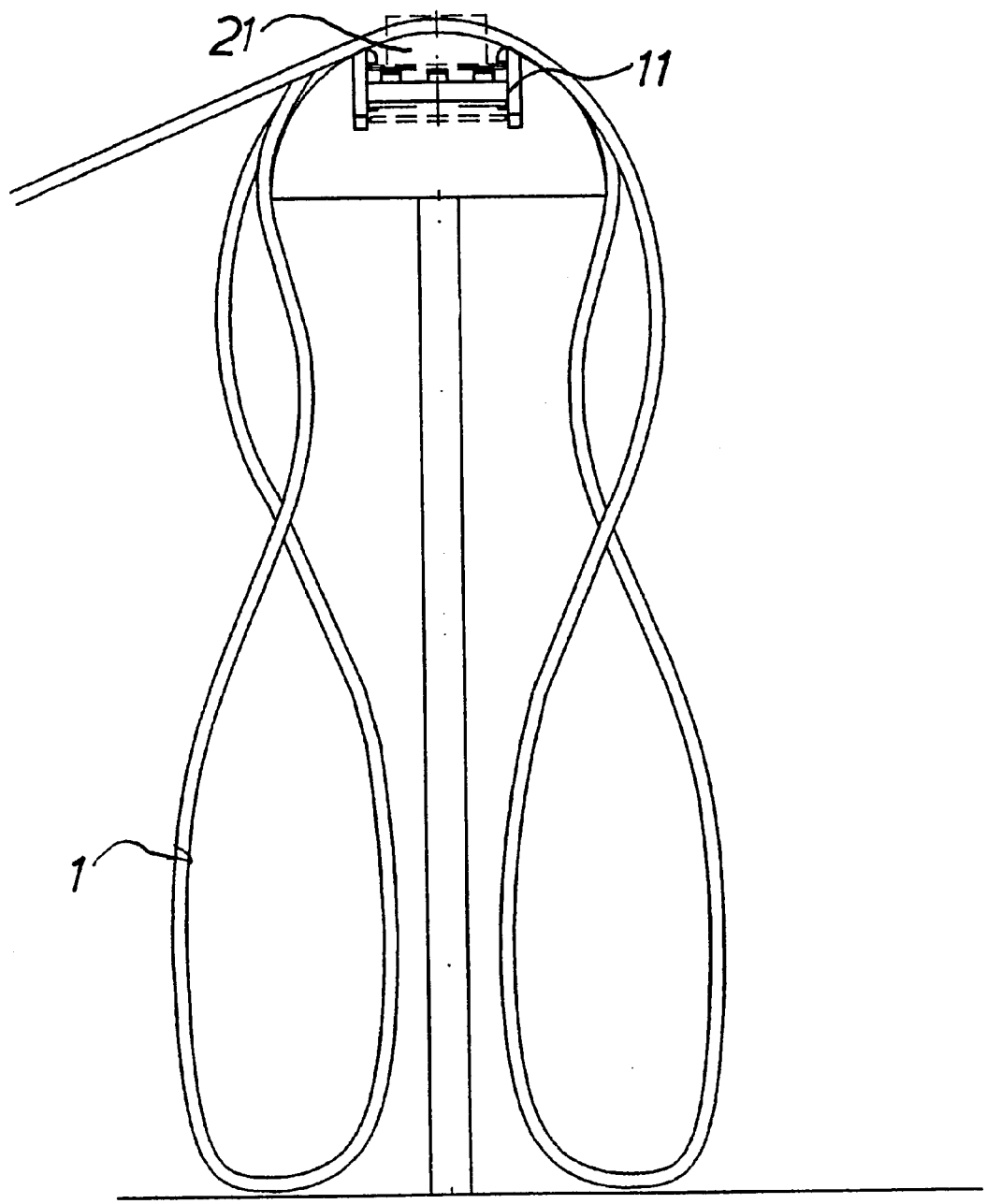
FIG. 6 is a section of a detail of the device shown in FIG. 5.

An alternative embodiment of the storage device is shown schematically in FIGS. 5 and 6. In this device a conveyor 21 is provided on each rack 11. During its retrieval, the cable runs from the retrieval device over guiding wheels and/or grooves and/or a guide funnel 25 to powered rubber wheels 9. From the rubber wheels 9 the cable is led down through a channel 22 which is pivotally mounted on an axis close to the outlet between the rubber wheels 9. The channel 22 swings to and fro over the rack 11 so that the cable 1 is laid to and fro over the rack 11 by conveyor 21. In connection with channel 22 or rubber wheel 9 there are preferably provided means for measuring the cable length that has run through, so that the speed with which the channel 22 is moved to and fro over the rack 11 is such that each loop of the cable which hangs down from the rack is the same length, and makes maximum use of the height from the top of the rack to the deck. On this device, too, the cable in its entire length is accessible for inspection, and also each individual section of cable is accessible for replacement if a fault is found.

When deploying the cable, the speed of the conveyor can be adjusted so that the cable is deployed at a speed equivalent to the speed of the boat during the deployment. Since each cable loop in this embodiment is not fixed, but determined by how far down towards the underlying deck the cable loop hangs, the speed of the conveyor alone will not control the deployment speed. Therefore, in the release zone there must be provided a detector, e.g., a measuring wheel, which measures the length of cable actually deployed and where these measurements give a basis for controlling the speed of the conveyor.

Moreover, between the individual rack parts there may be provided joining pieces as taught above for continuous deployment of cables which are stored on several parallel racks 11.

In the embodiments of the cable storage device shown in the figures, the cable is fed from the retrieval device to the stern of the ship, and the cable is placed on the rack from the stern. However, at its introduction onto the rack the cable may also be fed from in front of the rack 11.

Moreover, the racks 11 are also preferably of a length which is adjusted to the suspension of the cable of standard length, i.e., 10–12 km.

What is claimed is:

1. A combination comprising:

an ocean bottom seismic cable; and a device on board a vessel for storing said ocean bottom seismic cable, said device comprising: an elongated rack having a length dimension; said rack including means supporting said cable at spaced locations along said cable, with the spaced locations being spaced apart along the length dimension of said rack, wherein said means supporting said cable comprise: suspension devices secured to said cable at the spaced locations along said cable; and a track that extends along the length dimension of said rack for supporting said suspension devices and permitting movement of said suspension devices along the length dimension of said rack.

2. The combination according to claim 1 wherein said suspension devices comprise balls.

3. The combination according to claim 2 wherein said means supporting said cable further comprise attachment elements secured to said cable at the spaced locations along said cable, and said balls are secured to said attachment elements.

4. The combination according to claim 3 wherein the cable has a smallest bending radius, the attachment elements are cast on the cable and the attachment elements are of a length that is adapted to the smallest bending radius of the cable.

5. The combination according to claim 1 wherein said rack is constructed to suspend portions of said cable between the spaced locations along said cable below said rack.

6. A system for deploying a cable, in combination with the combination according to claim 1, said cable being stored on said device, said system comprising: means aligned with said rack for guiding said cable from said rack toward the stern of the vessel and for releasing said cable behind the vessel; and means for controlling the speed with which said cable is deployed from the vessel.

7. A combination comprising:

an ocean bottom seismic cable;

an elongated rack having a length dimension, said rack having an upper surface which extends along the length dimension and which supports said cable; and a conveyor provided on said rack and operative for advancing portions of said cable along said upper surface of said rack so that said cable forms loops which extend between portions of said cable that rest on said upper surface and which hang down from said rack.

8. A system for deploying a cable, in combination with the combination according to claim 7, said cable being stored on said device, said system comprising: means aligned with said rack for guiding said cable from said rack toward the stern of the vessel and for releasing said cable behind the vessel; and means for controlling the speed with which said cable is deployed from the vessel.

* * * * *